United States Patent [19]
Klingels

[11] Patent Number: 4,876,849
[45] Date of Patent: Oct. 31, 1989

[54] GAS TURBINE PROPULSION UNIT WITH A GAS GENERATOR

[75] Inventor: Hermann Klingels, Munich, Fed. Rep. of Germany

[73] Assignee: MTU Motoren- und Turbinen-Union Munchen GmbH, Fed. Rep. of Germany

[21] Appl. No.: 316,554

[22] Filed: Feb. 28, 1989

Related U.S. Application Data

[63] Continuation of Ser. No. 122,363, Nov. 18, 1987, abandoned.

[30] Foreign Application Priority Data

Nov. 20, 1986 [DE] Fed. Rep. of Germany ....... 3639684

[51] Int. Cl.⁴ .................................................. F02C 3/10
[52] U.S. Cl. ............................... 60/39.161; 60/39.163; 415/214.1; 416/241 B; 74/DIG. 5
[58] Field of Search .................... 60/39.163, 39.161; 74/DIG. 5; 415/214.1; 416/241 B

[56] References Cited

U.S. PATENT DOCUMENTS

| | | | |
|---|---|---|---|
| 2,801,076 | 7/1957 | Terrell et al. ........................ | 415/214 |
| 3,037,348 | 6/1962 | Gassmann ......................... | 60/39.163 |
| 3,507,113 | 4/1970 | Herrmann et al. ............... | 60/39.163 |
| 3,710,576 | 1/1973 | Evans et al. ...................... | 60/39.163 |
| 3,889,771 | 6/1975 | Kronogard ..................... | 74/DIG. 5 |
| 3,997,283 | 12/1976 | Kronogard ..................... | 74/DIG. 5 |
| 4,025,221 | 5/1977 | Kronogard ........................ | 60/39.163 |
| 4,028,883 | 6/1977 | Meyer-Kahrweg ............. | 60/39.163 |
| 4,064,690 | 12/1977 | Kronogard ........................ | 60/39.163 |

*Primary Examiner*—Donald E. Stout
*Attorney, Agent, or Firm*—Barnes & Thornburg

[57] ABSTRACT

In a gas generator of a gas turbine, the turbine is provided with more stages than aerodynamically necessary for reducing the turbine rotational speed. As a result thereof, the stresses of the turbine rotor are reduced, the latter can be made of ceramic material, and the turbine inlet temperature can be increased. In order to permit the compressor to continue to operate at optimum rotational speed, the compressor is coupled with the turbine by way of a transmission providing a speed-up. Owing to this arrangement, the thermal efficiency and therewith the economy of the gas turbine can be considerably increased and the heretofore occurring problems with the use of ceramic material in the turbine are solved in a simple manner.

19 Claims, 2 Drawing Sheets

GAS TURBINE PROPULSION UNIT WITH A GAS GENERATOR

This is a continuation of application Ser. No. 122,363 filed on Nov. 18, 1987, and now abandoned.

BACKGROUND AND SUMMARY OF THE INVENTION

The present invention relates to a gas turbine power plant with a gas generator, consisting of a compressor, of a combustion chamber and of a turbine coupled with the compressor whose turbine stages consist at least in part of ceramic materials.

The gas generator of a gas turbine power plant serves for the preparation of a compressed working gas which is capable by expansion in a power output turbine or in a thrust nozzle to provide power output. Good efficiencies of the individual components and as high a thermal efficiency as possible are of great significance for as effective as possible an operation of the gas turbine. In order to improve the thermal efficiency, attempts are presently under way to ever increase the turbine inlet temperature. However, in doing so one has encountered the limit as to what metallic materials in the turbine area are capable of withstanding also with intensive cooling by reason of thermal and mechanical stresses. The blade cooling itself thereby even causes an efficiency deterioration because a part of the compressed air has to be branched off and is not available for the working process. Additionally, the cooling medium flow influences the cascade flow in a negative way. In particular in small gas turbines, it is frequently too expensive or impossible to install complex cooling systems. One therefore attempts to manufacture the thermally highest stressed components of ceramic material in order to be able to further increase the temperature without loss-entailing cooling system.

However, serious disadvantages confront the advantages of ceramics, i.e., high temperature resistance, great wear and corrosion resistance, slight density and thermal expansion, which up to now have made the use of these materials appear as very problematical. Among these is a low tensional stressability or loadability, unfavorable fracture behavior by reason of the brittleness and strong scattering of the material quality. The centrifugal force stresses which occur at the required turbine rotational speeds are so large that turbine rotors or turbine blades of ceramic materials have not been successfully used up to now in series applications.

It is known from the DE-OS 24 24 895 to reduce the centrifugal force load or stress of a ceramic gas generator turbine stage in that one constructs this stage with considerably smaller radius. Additionally, one seeks to operate the gas generator with reduced rotational speed. However, as the compressor must produce a certain pressure ratio, this means with reduced rotational speed a larger outer diameter of the compressor rotor. The geometry of the compressor rotor assumes very unfavorable shapes and has, as a consequence thereof, a deterioration of the efficiency of these components.

Additionally, a small and slowly rotating first gas generator turbine stage is not capable to produce the power output which is necessary for the drive of the compressor. For that reason, the lacking power output has to be provided by a series-connected second turbine stage. This second turbine stage which operates at higher rotational speed is coupled with the gas g[enera]tor by way of a regulatable transmission.

However, notwithstanding a high structural e[xpendi]ture, this arrangement possesses a low efficie[ncy by] reason of the unfavorable compressor operation[.]

It is therefore the task of the present inven[tion to] eliminate by appropriate measures at the gas ge[nerator] the problems preventing the series utilization of c[eramic] materials and to operate the compressor and [turbine] each with optimal rotational speeds and efficien[cy.]

The solution of the task resides according to th[e pres]ent invention in the combination of the followi[ng fea]tures:

(a) The turbine consists of more stages than w[ould be] necessary from an aerodynamic point of view[, how]ever, at least of two stages;

(b) The turbine is coupled with the compres[sor by] way of a transmission providing a speed-up;

By the increase of the number of stages, a s[maller] energy drop is involved per turbine stage, and t[he tur]bine rotational speed can be lowered. By the co[mbina]tion of this multi-stage turbine with a transmissi[on pro]viding a speed-up transmission ratio, the disadva[ntages] of such slowly rotating turbines for the gas t[urbine,] especially for the compressor, can be avoided. [By an] appropriate selection of the transmission ratio [of the] transmission, the compressor can be operated at [its] specific rotational speed and good efficiency n[otwith]standing low turbine rotational speed, whereas [at the] same time, the advantages of slowly rotating tu[rbines] can be utilized. By reason of the reduced velocit[ies] and of the slight gas flow deflection in the turbi[ne, the] friction losses and the profile base losses in the ca[scade] are reduced. The gas forces on the blades b[ecome] smaller and by reason of the lower blade twist, a[lso a] reduction in the profile leading and trailing edg[e area] results. As the stresses of the turbine blades drop c[onsid]erably thereby, the latter can be made of ceramic [mate]rials. As a result thereof, the turbine temperatu[re and] therewith the thermal efficiency of the gas turbi[ne can] be considerably increased without having to ha[ve re]course to a blade cooling system and the losse[s con]nected therewith.

According to a further feature of the present [inven]tion, the transmission may be constructed as spu[r gear] transmission, Planetary gear transmission or [draw] means transmission. The advantage results fro[m the] construction as gear transmission that the comp[ressor] shaft and the turbine shaft have opposite directi[ons of] rotation and the gyroscopic couples are cance[lled in] part. With a planetary gear coaxiality of the two [shafts] and smaller structural volume would be of adv[antage] whereby input and output can take place by v[irtue of] every kinematically meaningful combination of [sun,] planetary gear and ring gear. A draw means tra[nsmis]sion offers the advantage of a noiseless operatic[n and] the elimination of costly lubricating devices f[or the] transmission.

In one embodiment as a shaft output power pl[ant an] output transmission coupled between a power [output] turbine and an output shaft can be accommodat[ed ad]vantageously in a common housing together wi[th the] transmission disposed in the gas generator. Th[e con]structive and servicing expenditures, the lubr[icant] supply and the dimensions of the power plant [are re]duced in this manner.

According to a further feature of the present [inven]tion, it is proposed that the turbine shaft of t[he]

generator and the transmission gear on the turbine side have separate shafts which are connected by way of a clutch. It is thus avoided that vibrations of the turbine are transmitted onto the transmission or vice versa. Additionally, housing deformations are no longer as strongly effective on the rotor. An intermediate shaft may thereby arranged advantageously between the two shafts.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
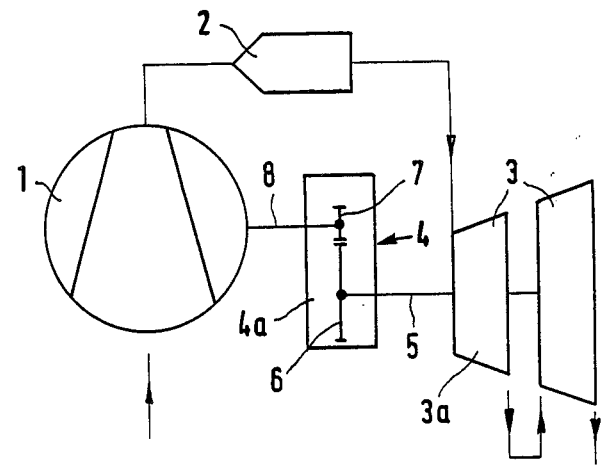
FIG. 1 is a schematic view of the gas generator components with the intermediate transmission in accordance with the present invention.

Referring now to the drawing wherein like reference numerals are used throughout the various views to designate like parts, in the gas generator illustrated in FIG. 1, a compressor 1 is connected with the two-stage turbine 3 by way of a combustion chamber 2, and a two-stage turbine 3 is connected by way of a turbine shaft 5 with a transmission gear 6 of a spur gear transmission 4a. The smaller transmission gear 7 on the side of the compressor together with the compressor 1 is supported on a common shaft 8.

Figure 2:
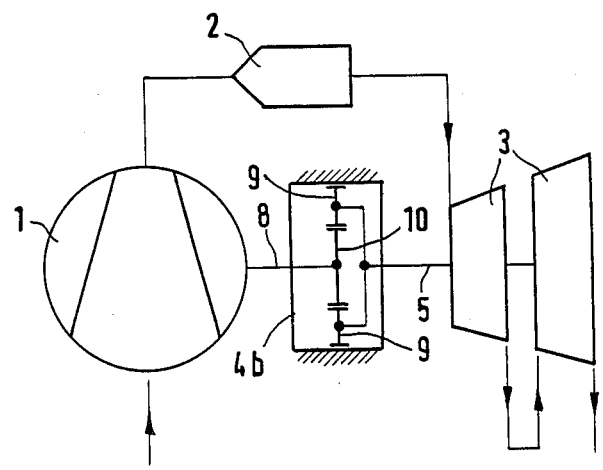
FIG. 2 is a schematic view of an embodiment in accordance with the present invention with planetary gear.

The embodiment in FIG. 2 is characterized in that the compressor shaft 8 and the turbine shaft 5 are arranged coaxially and are connected by way of a planetary gear 4b. On the turbine side, the planet gears 9 drive the sun gear 10 coupled with the compressor shaft 8.

Figure 3:
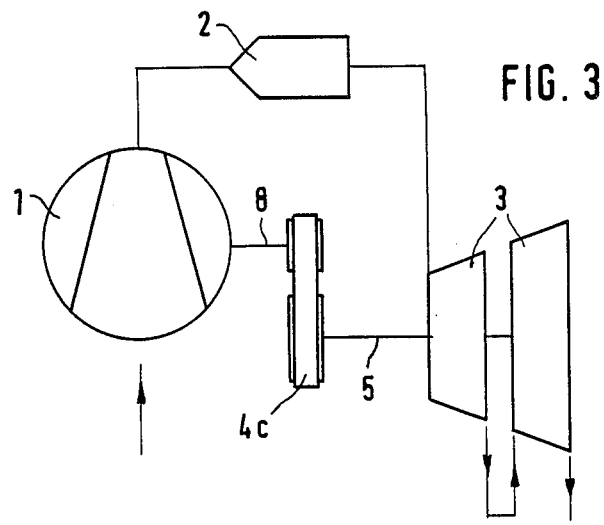
FIG. 3 is a schematic view of a modified embodiment in accordance with the present invention with a draw means transmission.

In the embodiment illustrated in FIG. 3, the transmission of the gas producer is constructed as draw means transmission 4c.

Figure 4:
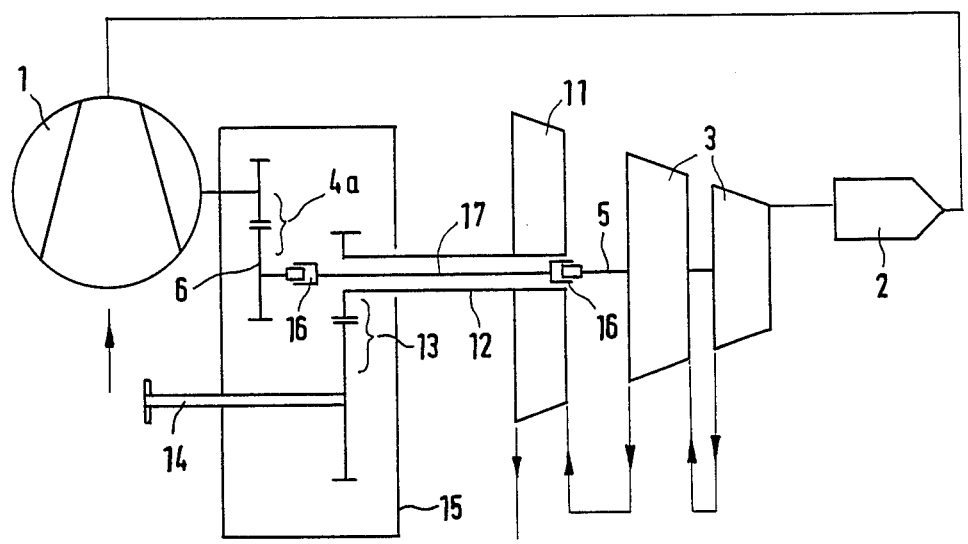
FIG. 4 is a schematic view of a still further modified embodiment in accordance with the present invention as shaft power output plant with output transmission and gas generator transmission in a common housing.

FIG. 4 illustrates an embodiment as shaft power output Plant in which——as described in connection with FIG. 1——the compressor 1 and the two-stage turbine 3 of the gas generator are connected by way of a spur gear transmission 4a. The combustion chamber 2 is arranged to the rear of the turbine 3 of the gas generator whereas a power output turbine 11 is located on a concentric shaft 12 in front thereof. The power output is transmitted to the output shaft 14 by way of the output transmission 13. The output transmission 13 is thereby accommodated together with the spur gear transmission 4a of the gas generator in a common transmission housing 15. The turbine shaft 5 is coupled with the transmission gear 6 by way of clutches 16 and an intermediate shaft 17.

While I have shown and described several embodiments in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. A gas turbine power plant, comprising a gas generator unit and power output means, said gas generator unit including:

gas generator compressor means, combustion chamber means, gas generator turbine means drivingly coupled with the gas generator compressor means, said gas generator turbine means including at least two turbine stages with ceramic turbine blade parts, and gas generator transmission means drivingly connecting the gas generator turbine means to the compressor means independently of said power output means, said gas generator means exhibiting a predetermined transmission ratio providing a speed-up of the compressor means as compared to the gas generator turbine means whereby the gas generator turbine means can be operated at relatively low speeds with consequent reduction in centrifugal force induced stress while still permitting optimal rotational speeds and efficiencies of the compressor means and gas generator turbine means.

2. A gas turbine power plant according to claim 1, wherein the gas generator transmission means is constructed as one of a spur gear transmission, a planetary gear transmission or a draw means transmission.

3. A gas turbine power plant according claim 2, wherein the gas generator transmission means and an output transmission coupled with a power output turbine means of the power output means are accommodated in a common housing.

4. A gas turbine power plant according to claim 3, wherein the power output turbine means and transmission gear means of the gas generator transmission means coupled on the gas generator turbine means side have separate shafts.

5. A gas turbine power plant according to claim 4, wherein the gas generator turbine shaft and a transmission gear means of the gas generator transmission means on the gas generator turbine means side are coupled by way of an intermediate shaft.

6. A gas turbine power plant according to claim 5, wherein said intermediate shaft is operable to be coupled with the gas generator turbine shaft and the gas generator turbine-side transmission gear means by way of separate clutches.

7. A gas turbine power plant according to claim 1, wherein the gas generator transmission means and an output transmission coupled with a power output turbine means of the power output means are accommodated in a common housing.

8. A gas turbine power plant according to claim 1, wherein the gas generator turbine means and a transmission gear of the gas generator transmission means coupled on the turbine means side have separate shafts.

9. A gas turbine power plant according to claim 8, wherein the gas generator turbine shaft and the gas generator transmission gear means on the gas generator turbine means-side are coupled by way of an intermediate shaft.

10. A gas turbine power plant according to claim 9, wherein said intermediate shaft is operable to be coupled with the gas generator turbine shaft and the gas generator turbine means-side gear of the gas generator transmission means by way of separate clutches.

11. A gas turbine power plant according to claim 1, wherein the gas generator transmission means is a spur gear transmission comprising a large gear rotatable with a gas generator turbine shaft of the gas generator turbine means and drivingly engaged with a smaller gear rotatable with a compressor shaft of the gas generator compressor means.

12. A gas turbine power plant according to claim 1, wherein the gas generator transmission means is a planetary gear transmission with rotational axes of the gas generator compressor means and turbine means aligned on a common axis.

13. A gas turbine power plant according to claim 12, wherein planetary gear means of the planetary gear transmission are rotatable with the gas generator turbine means and spur gear means of the planetary gear transmission are rotatable with the gas generator compressor means.

14. A gas turbine power plant according to claim 1, wherein the gas generator transmission means is a draw means transmission with draw means drivingly connecting different size pulleys driven by the respective gas generator turbine means and compressor means.

15. A gas turbine power plant according to claim 11, wherein the power output means includes power output turbine means, said power output turbine means being drivingly connected to a power output shaft.

16. A gas turbine power plant according to claim 13, wherein said gas generator transmission means includes an intermediate shaft extending coaxially to a common rotational axis of the gas generator turbine means and the power output turbine means.

17. A gas turbine power plant according to claim 16, wherein said intermediate shaft is connectible at one end to be directly driven by said gas generator turbine means and at its opposite end to an output shaft of the gas generator transmission means.

18. A gas turbine power plant according to claim 17, wherein clutch means are operatively connected at each end of the intermediate shaft.

19. A gas turbine power plant according to claim 18, wherein said gas generator transmission means and a further power output transmission means for drivingly connecting the power output shaft and the power output turbine means are arranged in a common housing.

* * * * *